Oct. 30, 1962  K. L. DAVIES  3,061,078
TRANSFER FEED MECHANISMS
Filed Dec. 5, 1960  3 Sheets-Sheet 1
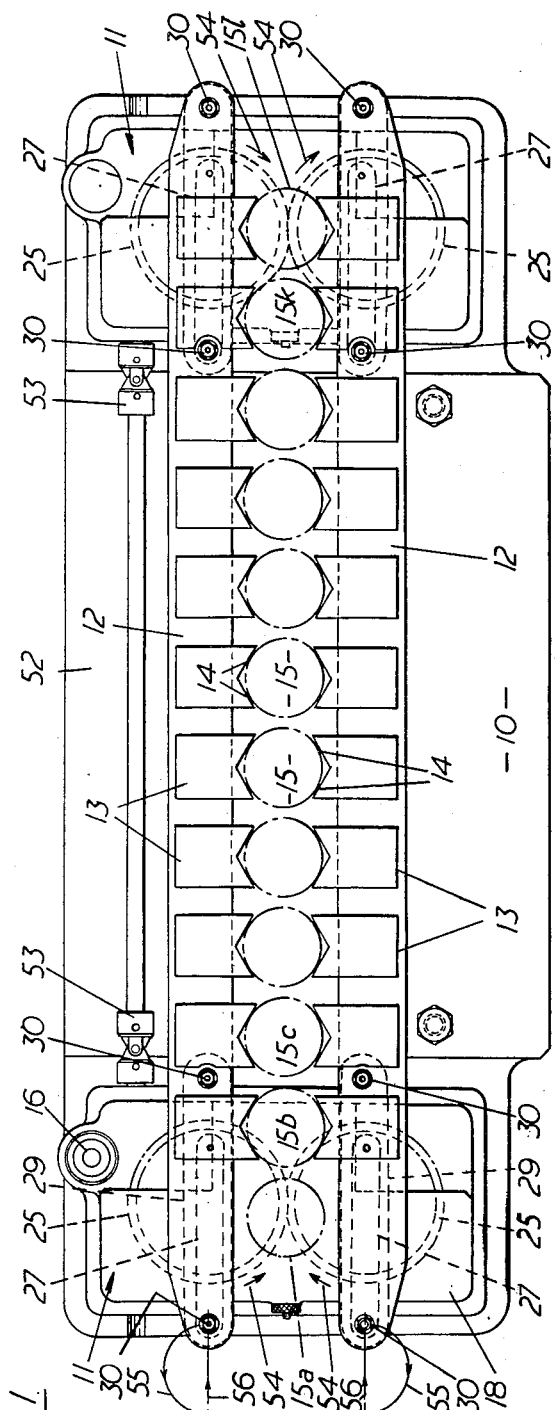
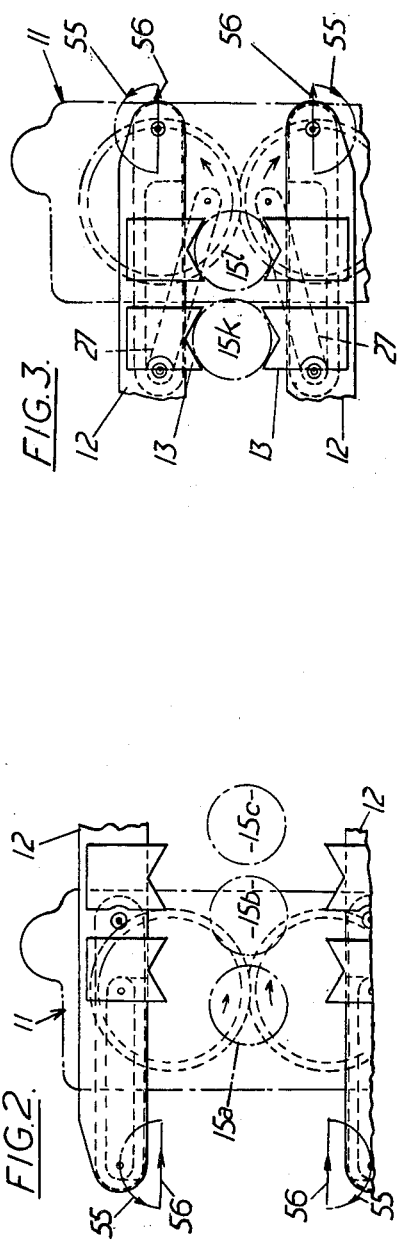
*Inventor*
KENNETH LESLIE DAVIES
By
*Attorney*

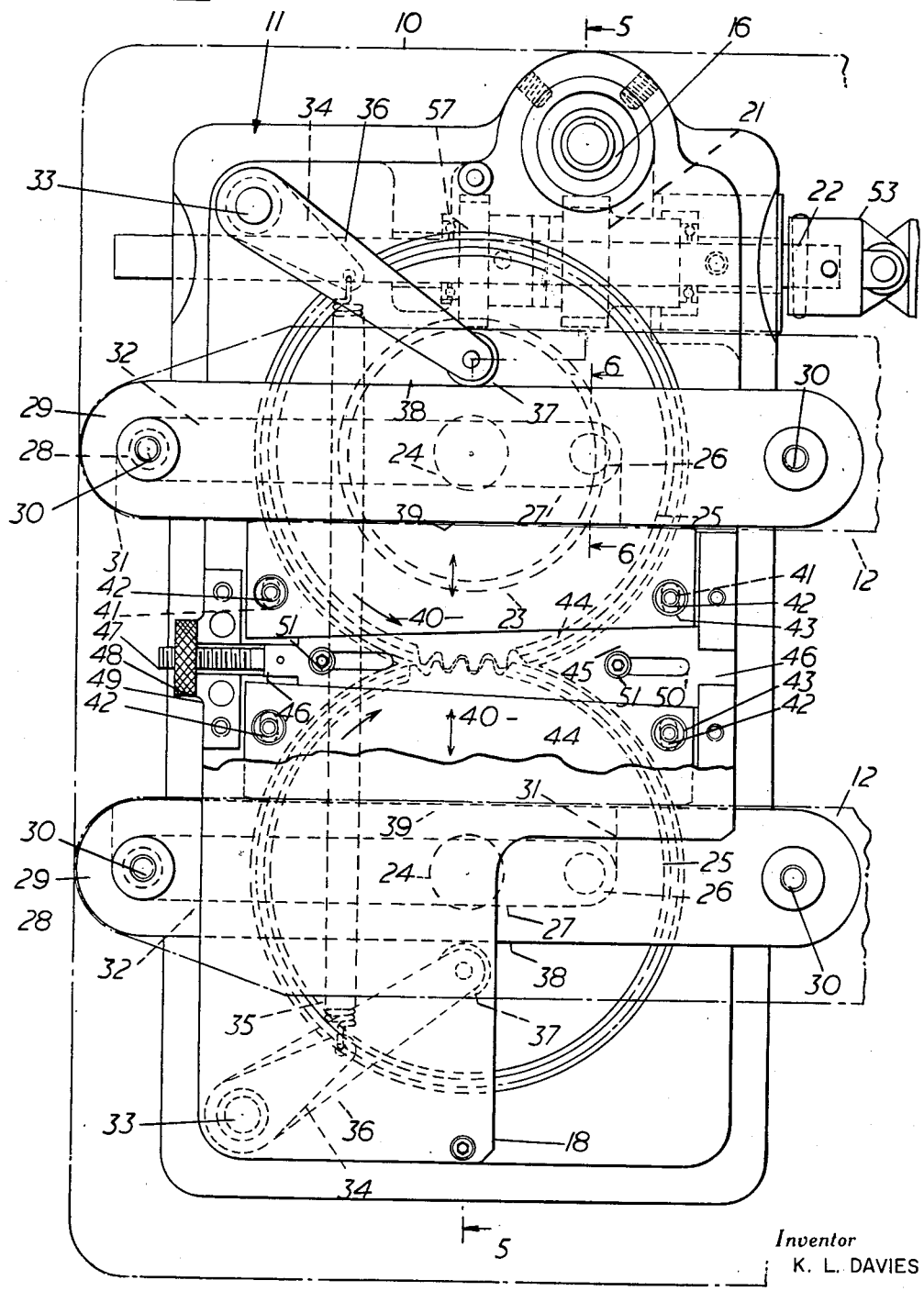

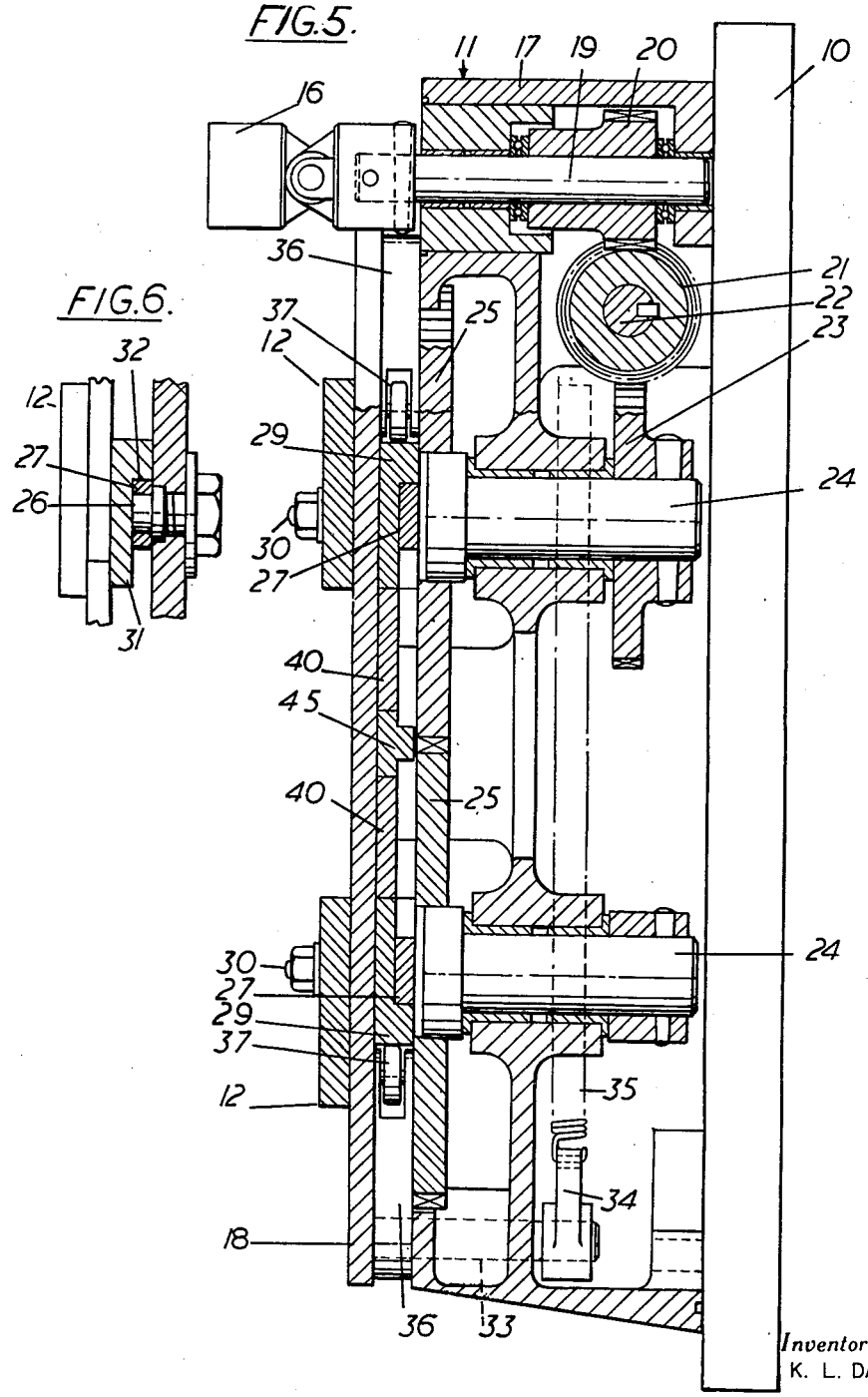

United States Patent Office 3,061,078
Patented Oct. 30, 1962

3,061,078
TRANSFER FEED MECHANISMS
Kenneth Leslie Davies, Burnage, Manchester, England, assignor to Hordern, Mason & Edwards Limited, Birmingham, England, a British company
Filed Dec. 5, 1960, Ser. No. 73,846
11 Claims. (Cl. 198—218)

This invention relates to transfer feed mechanism of the kind comprising one or more feed members adapted directly or indirectly to engage one or more workpieces and means for moving the feed members in repeated cycles each of which includes movement of a feed member to an initial position to locate a workpiece, movement of the feed member and thus of a workpiece in the required direction of feed of the workpiece to advance same to an advanced position, movement of the feed member away from the workpiece in the advanced position and return movement of the feed member towards the initial position ready for another cycle.

By means of such mechanism, a succession of workpieces may be advanced intermittently, to, between and from successive work stations at each of which an operation may be performed thereon, or a succession of workpieces may be fed to and removed from a single work station between a punch and die in a power press.

An object of the present invention is to provide an improved mechanism which is compact in size as compared with known mechanisms of this kind, and which has its working parts movable during each cycle over a relatively small area compared with the feed stroke through which each workpiece is advanced, to enable the mechanism to be installed in a limited space, for example, that available in certain power presses between the uprights thereof.

Further objects of the invention are to enable a mechanism to be installed in a machine tool or press and be usable with any of a number of various feed members, so that in order to change the press from a condition in which it is ready to perform one specific operation to a condition in which it is ready to perform another operation, it is only necessary insofar as the feed mechanism is concerned to change the or each feed member; and to provide a feed mechanism which is capable of rapid operation.

Other objects and advantages will be apparent from the specification and claims and from the accompanying drawings in which:

FIGURE 1 is a plan view of a transfer feed mechanism having a pair of workpiece feed members which are shown at the end of their rectilineal feed movements in advanced positions, FIGURE 2 is a similar view to FIGURE 1 showing the left-hand end thereof with the workpiece feed members mid-way of their return movements between their advanced positions and initial positions, FIGURE 3 is a similar view to FIGURE 1 showing the right-hand end thereof with the workpiece feed members mid-way of their rectilineal feed movements between their initial and advanced positions, FIGURE 4 is an enlarged plan view of the left-hand end of the mechanism having part thereof removed for clarity and with the workpiece feed members in the positions as shown in FIGURE 1, FIGURE 5 is a cross-sectional view of FIGURE 4 on the lines 5—5 thereof and, FIGURE 6 is a detail cross-sectional view taken on the lines 6—6 of FIGURE 4.

The transfer feed mechanism comprises a bolster 10 which extends from end-to-end of the feed mechanism and is adapted to be secured onto the bed (not shown) of a power press. Disposed at each end of the bolster is a driving means 11 for a pair of workpiece feed members 12 of elongated form and these workpiece feed members have attached thereto jaws 13 having V-formations 14 to engage and locate circular workpieces generally indicated at 15 which are required to be fed rectilineally in an intermittent manner from the left-hand end to the right-hand end of the transfer mechanism as viewed in FIGURE 1 to enable the workpieces to be subjected in turn to a press operation or operations.

In order that the intermittent movement of the workpiece feed members 12 is synchronised with the operation of the punch or other movable tool mounted in the press the driving mechanism of the press is adapted to be connected to a universal joint coupling 16 forming a permanent part of the left-hand driving means 11 shown in FIGURE 1 so that the transfer or feed of the workpieces 15 only occurs when the workpieces are not being operated upon by the press tools.

Each driving means 11 comprises a box-like housing 17 secured onto the bolster 10 and provided with a T-shaped top plate 18 and the workpieces are fed gravitationally in a known manner from a magazine onto the top plate 18 of the left-hand driving means into a position indicated at 15a and from said top plates the workpieces are transferred or fed intermittently towards the right-hand driving means 11 and onto the top plate 18 thereof into a final position 151 from which they are passed to a receiver in any known manner and after being subjected to the required press operations. The workpieces between the two top plates 18 are supported by an intermediate plate (not shown) secured to the bolster and this plate and the bolster are suitably cut away to receive a convenient die or dies (not shown) with which the workpieces are aligned in turn so as to be operated upon by the punch and it follows therefore that the top plates 18, intermediate plate and die or dies provide a plurality of surfaces which are co-planar to enable the workpieces to be transferred from one end of the mechanism to the other.

The universal joint coupling 16 is secured to the upper end of a vertical shaft 19 rotatably mounted in the housing and to which is secured a skew gear 20 meshing with a skew gear 21 secured to a horizontal shaft 22 rotatably mounted in the housing 11. Also secured to the shaft 22 is a skew gear 57 which meshes with a gear 23 secured to the lower end of a vertically disposed spindle 24 rotatably supported by the housing and having secured thereto adjacent its upper end a spur gear 25. The parts 24 and 25 provide a rotatable member and secured to the spur gear 25 is a crank-pin 26 which projects upwardly above the upper face of the spur gear 25.

The driving means also comprises a further spindle 24 and spur gear 25 having a crank-pin 26 and the two spur gears 25 mesh with each other so that the two rotatable members in the driving means are mechanically coupled together to rotate in synchronism.

Each crank-pin 26 has pivotally mounted thereon the one end of a link 27 the other end of which is pivotally mounted upon a coupling pin 28 secured to an end of a bar 29.

The two bars 29 in a driving means are disposed below the top plate 18 and projecting upwardly adjacent each end of each bar is a peg 30 and the two pegs on a bar are adapted to engage two holes disposed adjacent one end of a workpiece feed member 12 so that the workpiece feed member can be locked in an immovable manner to the bar so as to move therewith. The workpiece feed member can be secured to the bar by nuts engaging the pins 30 and in this way the workpiece feed members can be removed and replaced by further members without removing the links or bars of the driving means. When the workpiece feed members 12 are in position said members lie on top of the top plates 18.

Each bar 29 is formed in its underside with a recess 31 which is open at one edge of the bar and has a wall 32 adjacent the other edge of the bar, this recess 31 being clearly shown in FIGURE 6, and the link 27 is arranged to operate within the recess 31 and the two walls in the two bars to which a workpiece feed member can be secured are considered to form an abutment so that a pair of abutments are provided associated respectively with the pair of workpiece feed members.

Rotatably mounted in the housing 17 is a pair of vertically disposed rods 33 each having a short arm 34 secured to its lower end and the two short arms are connected together by a helical tension spring 35, and each having secured to its upper end a long arm 36 provided with a roller 37 at its end remote from the rod 33 and which roller is adapted to bear against the edge 38 of a bar 29.

The spring-urged lever mechanism comprising the spring 35 and arms 34, 36 and roller 37 operates to urge the two bars 29 so that their edges 39 abut stop means in the form of plates 40 secured to the housing 17 in an adjustable manner. This adjustment is obtained by forming elongated holes 41 in a stop plate 40 and through which holes 41 extend screw-threaded studs 42 secured in the housing and having nuts 43 thereon to enable the stop plate 40 to be released for adjustment towards and from a respective bar 29 and afterwards clamped in the adjusted position.

In order to enable the two stop plates 40 of a driving means to be adjusted simultaneously and equally and in a sensitive manner each stop plate is provided with an inclined edge 44 and the two opposed inclined edges 44 co-operate with adjustment means in the form of a wedge member 45 which is guided in a longitudinal manner by tongues 46 on the wedge member engaging slots or the like in the housing or parts secured thereto. In order to adjust the wedge member 45 in a longitudinal manner a screw-threaded stud 47 extends from the one tongue 46 and has applied thereto a manually operable knurled nut 48 which pulls up against an abutment 49 so that by rotating the nut 48 the wedge member 45 and thus the stop plates 40 can be adjusted into required positions. The wedge member is formed with elongated holes 50 with which are associated screw means 51 whereby the wedge member 45 can be locked in its required position after adjustment thereof.

The driving means 11 above described is that at the left-hand end of FIGURE 1 but it should be appreciated that the other driving means 11 disposed at the right-hand end of FIGURE 1 is identical with that previously described with the exception that a universal joint coupling 16 is not provided and the two driving means are mechanically coupled together by means of a shaft 52 which connects the two horizontal shafts 22 in the two driving means 11 through universal joint couplings 53 and in this way the two driving means 11 are mechanically connected together to operate in unison and in synchronism with the press.

One workpiece feed member 12 is mounted on a pair of bars 29 of which one is associated with the one driving means 11 whilst the other is associated with the other driving means 11 whilst the other workpiece feed member 12 is mounted on the other bars 29 of the two driving means 11 and in this way each workpiece feed member is coupled at spaced apart positions to a pair of links 27 which are coupled to a pair of crankpins.

The operation of the transfer feed mechanism will now be considered from the position shown in FIGURE 1 and in which position the workpieces 15 are shown in their advanced stationary positions ready to be operated upon by the punch or the like of the press.

The four spur gears 25 are each continuously rotated in a uni-directional manner so that each crank-pin 26 moves continuously in a uni-directional circular path and the directions of rotation of the spur gears 25 and the crank-pins 26 are indicated by the arrows 54 in FIGURE 1. In this position each link 27 abuts the wall 32 in the recess 31 in the appropriate bar 29 so that the link and bar are locked together and thereafter describe a semi-circular path indicated diagrammatically at 55 in FIGURE 1 and during rotation of the crankpins through an arc of 180° from the position shown in FIGURE 1. The positions of the feed members 12 and pairs of jaws 13a, 13b relative to workpieces 15b, 15c after only 90° of movement by the crank-pins 26 are shown in FIGURE 2 and at the end of the 180° of movement the pairs of jaws 13a and 13b engage the workpieces 15a and 15b respectively and this position is referred to as the initial position of the various parts. In this initial position the four bars 29 abut the stop plates 40 preventing said bars and the feed members and pairs of jaws 13 moving in closer together and in these positions the workpieces 15 are engaged and located by the jaws.

During the next 180° of movement of the crank-pins 26 the links swing about the coupling pins 28 relative to the bars 29 and the feed members 12 and move said feed members in a direction from left to right of FIGURE 1 and due to the bars 29 being maintained in abutting relation with the stop plates 40 by means of the spring-urged levers 36 the bars 29 and thus the feed members 12 and jaws 13 are constrained to move in a rectilineal manner an amount equal to the diameter of the circles which the crank-pins described and this rectilineal movement is indicated at 56 in FIGURES 1 to 3. Thus the feed members 12 and the jaws 13 move in repeated cycles and described D-shaped paths as indicated at 55 and 56 in FIGURES 1 to 3.

The relative positions of the links 36, bars 29 and feed members 12 and also the workpieces 15k and 15l when the bars have made half their total rectilineal movement are shown in FIGURE 3.

In order that the mechanism operates as quietly as possible one or both of the surfaces provided by the walls 32 of the bars 29 and the co-operative edges of the links 27 and also the edges 39 of the bars and the co-operative edges of the stop plates 40 may have applied thereto a strip or strips of a resilient material which may be a plastics material such as nylon or may be rubber such as sponge rubber.

Instead of the feed members being spring-urged against the stop means in the manner illustrated and including the tension spring 35, a tension spring (not shown) may be mounted on each coupling pin 28 and is operative to urge a link 27 and its associated bar 29 from the position shown in FIGURE 3 to the position shown in FIGURE 1, thereby urging the feed member against the stop means.

Instead of the transfer feed mechanism having a pair of movable workpiece feed members, only one movable workpiece feed member may be employed to engage a workpiece on one side and a stationary workpiece support member or stationary abutment member is employed to engage the other side of the workpiece and along which the workpiece can slide during its feed movement by the movable workpiece feed member.

The invention thus provides an improved transfer feed mechanism which is of compact form and is capable of rapid operation and enables easy and quick change of feed members so that the mechanism can be easily and quickly modified to suit different workpieces and operations thereof and enables a conventional press when fitted with transfer feed mechanism to operate as a transfer feed press.

What I claim then is:

1. A transfer feed mechanism for advancing workpieces intermittently into and out of successive work stations comprising a pair of workpiece feed members adapted to engage at least one workpiece on opposite sides thereof, two pairs of crankpins of which the crankpins in each pair are rotatable in circular paths about axes spaced apart transversely thereof in the intended direction of rectilineal feed movement of the workpiece feed members, means for continuously rotating the two pairs of crankpins of which one pair is rotated uni-directionally in one direction and the other pair is rotated uni-directionally in the opposite direction, two pairs of links of which one pair is coupled respectively to one pair of crankpins and the other pair of links is coupled respectively to the other pair of crankpins and one pair of links is coupled to one workpiece feed member and other pair of links is coupled to the other workpiece feed member at positions spaced apart along the workpiece feed members in the intended direction of feed movement of the workpiece feed members, and a pair of abutments of which one is associated with one workpiece feed member and the other of which is associated with the other workpiece feed member and with which pair of abutments the pairs of links can respectively co-operate at one edge of each link to lock the respective workpiece feed members and links together during part only of each complete revolution of the crankpins so that the respective workpiece feed members also move through part circular return paths whilst dis-engaged from the workpiece and from which abutments the respective pairs of links can move during the remaining part of each complete revolution of said crankpins to impart the intended rectilineal feed movement to the workpiece feed members in the same parallel directions and thus also to the workpiece which the said workpiece feed members engage.

2. A transfer feed mechanism according to claim 1 and further comprising four bars each of which has pivoted thereto a link and forms the abutment for the link and detachable securing means to enable a workpiece feed member to be detachably secured to a pair of bars associated with a pair of links.

3. A transfer feed mechanism according to claim 2 and further comprising a recess formed in each bar and which recess is open at one edge of the bar to enable a link associated therewith to move into and out of the recess and which recess has a wall which constitutes the abutment for the link.

4. A transfer feed mechanism according to claim 1 and further comprising stop means with which the workpiece feed members are associated to guide the workpiece feed members in a rectilineal manner during their feed movements, spring means associated with the workpiece feed members to urge said workpiece feed members against the stop means and adjustment means to enable the positions of the stop means to be adjusted to vary the positions assumed by the workpiece feed members relative to the workpiece during the feed movement of the said members.

5. A transfer feed mechanism according to claim 4 and further comprising a movable wedge member which forms the adjustment means and co-operates with the stop means, means to guide the wedge member and means to effect fine adjustment movement of the movable wedge member to adjust the position of the stop means.

6. A transfer feed mechanism according to claim 5 and wherein the movable wedge members co-operative with two stop means of which one is associated with one workpiece feed member and the other of which is associated with the other workpiece feed member whereby adjustment of the movable wedge member adjusts the positions of two stop means associated with the two workpiece feed members.

7. A transfer feed mechanism for advancing workpieces intermittently into and out of successive work stations comprising a workpiece feed member adapted to engage at least one workpiece, a workpiece support member complementary to the workpiece feed member to co-operate therewith at opposite sides of a workpiece, a pair of crankpins rotatable in circular paths about axes spaced apart transversely thereof in the intended direction of rectilineal feed movement of the workpiece feed member, means for continuously rotating the pair of crankpins uni-directionally in the same directions, a pair of links coupled respectively to the pair of crankpins and to the workpiece feed member at positions spaced therealong in the direction of intended feed movement of the workpiece feed member and an abutment associated with the workpiece feed member and with which said pair of links can co-operate at one edge of each link to lock the workpiece feed member and links together during part only of each complete revolution of the crankpins so that the workpiece feed member also moves through a part circular return path whilst dis-engaged from the workpiece and from which abutment the pair of links can move during the remaining part of each complete revolution of said crankpins to impart the intended rectilineal feed movement of the workpiece feed member and thus also to the workpiece which the said workpiece feed member engages.

8. A transfer feed mechanism according to claim 7 and further comprising a pair of bars each of which has pivoted thereto and link and forms the abutment for the link and detachable securing means to enable the workpiece feed member to be detachably secured to the two bars associated with the pair of links.

9. A transfer feed mechanism according to claim 8 and further comprising a recess formed in each bar and which recess is open at one edge of the bar to enable a link associated therewith to move into and out of the recess and which recess has a wall which constitutes the abutment for the link.

10. A transfer feed mechanism according to claim 7 and further comprising stop means with which the workpiece feed member is associated to guide the workpiece feed member in a rectilineal manner during its feed movement, spring means associated with the workpiece feed member to urge said workpiece feed member against the stop means and adjustment means to enable the position of the stop means to be adjusted to vary the position assumed by the workpiece feed member relative to the workpiece during the feed movement of the said member.

11. A transfer feed mechanism according to claim 10 and further comprising a movable wedge member which forms the adjustment means and co-operates with the stop means, means to guide the wedge member and means to effect fine adjustment movement of the movable wedge member to adjust the position of the stop means.

References Cited in the file of this patent
FOREIGN PATENTS
270,636     Germany _____ Feb. 19, 1914